US006650993B2

(12) United States Patent
Wolf et al.

(10) Patent No.: US 6,650,993 B2
(45) Date of Patent: Nov. 18, 2003

(54) AUTOMATIC START/STOP SYSTEM AND METHOD FOR LOCOMOTIVE ENGINES

(75) Inventors: Daniel F. Wolf, Erie, PA (US); Gerald James Hess, Jr., Erie, PA (US); Jeffrey A. Twichel, Girard, PA (US)

(73) Assignee: General Electric Company, Schenectady, NY (US)

( * ) Notice: Subject to any disclaimer, the term of this patent is extended or adjusted under 35 U.S.C. 154(b) by 320 days.

(21) Appl. No.: 09/873,841

(22) Filed: Jun. 4, 2001

(65) Prior Publication Data

US 2002/0183917 A1 Dec. 5, 2002

(51) Int. Cl.[7] .............................. G06G 7/70; F02N 17/00
(52) U.S. Cl. .................... 701/112; 123/179.4; 701/115; 701/114
(58) Field of Search ............................... 701/112, 114, 701/115, 102, 107, 113, 110; 123/179.4

(56) References Cited

U.S. PATENT DOCUMENTS

| 4,042,810 | A | * | 8/1977 | Mosher ........................ 701/19 |
| 4,046,032 | A | | 9/1977 | Braun et al. |
| 5,528,901 | A | | 6/1996 | Willis |
| 5,828,979 | A | | 10/1998 | Polivka et al. |
| 5,878,711 | A | | 3/1999 | Kamura et al. |
| 5,928,110 | A | | 7/1999 | Vornehm et al. |
| 5,941,792 | A | | 8/1999 | Amendt et al. |
| 6,126,247 | A | * | 10/2000 | Paul et al. ....................... 303/7 |
| 6,170,452 | B1 | | 1/2001 | Wisinski |
| 6,322,025 | B1 | * | 11/2001 | Colbert et al. .......... 246/167 R |
| 6,470,844 | B2 | | 10/2002 | Biess |

FOREIGN PATENT DOCUMENTS

| JP | 2002-330503 | * | 11/2002 | ............ B60L/15/40 |
| JP | 2002-330504 | * | 11/2002 | ............ B06L/15/40 |

* cited by examiner

*Primary Examiner*—Hieu T. Vo
(74) *Attorney, Agent, or Firm*—Senniger, Powers, Leavitt & Roedel; Carl Rowold

(57) ABSTRACT

An automatic start/stop system for locomotive engines which takes into account operator needs and concerns by enabling operators to locally prevent automatic shutdowns of their locomotives without disabling their AESS systems. Thus, operators can maintain their lead (and/or other) units running (i.e., for peace of mind, climate control, etc.) without prohibiting other locomotives in consist from automatically shutting down. The system preferably includes an inhibit switch located in each locomotive control cabin which, when actuated by an operator, prevents that locomotive (and only that locomotive) from automatically shutting down within a predefined duration of time. Techniques for reminding and prompting an operator to enable an AESS system include sounding an alarm, displaying and recording fault data, and inhibiting motoring of the locomotive when the AESS system is disabled and the operator calls for braking or motoring capability.

29 Claims, 2 Drawing Sheets

AUTOMATIC START/STOP SYSTEM AND METHOD FOR LOCOMOTIVE ENGINES

FIELD OF THE INVENTION

The present invention relates to locomotive fuel conservation, and more particularly to automatically starting and stopping locomotive engines for the purpose of conserving fuel.

BACKGROUND OF THE INVENTION

In recent years, locomotives have been equipped with systems for automatically starting and stopping their engines when one or more conditions exist. The primary purpose of such systems is to conserve fuel, thereby lowering fuel costs while also preserving precious energy resources. For instance, a locomotive may be configured to automatically shutdown after operating for a certain amount of time in a parked idle state to prevent the locomotive from needlessly wasting fuel. The locomotive may then automatically restart when, for example, an operator signals an intention to motor the locomotive, such as by moving a direction controller (known as a reverser) from a center position (that is, from a "neutral" position). A locomotive may also be configured to automatically restart a certain amount of time following an automatic shutdown, such as two or four hours, or when other conditions exist.

The automatic engine start and stop (AESS) system described above has been implemented not only in locomotives which operate independently, but also in multiple locomotives that operate together (i.e., in consist) for providing cumulative (or reserve) towing capacity. The front locomotive in the consist is usually designated the lead unit while the other locomotives are designated trail units. Each trail unit typically receives a trainline signal representing the position of the lead unit's reverser, and treats that signal as representing the position of its own reverser (which is typically placed in the center position when configuring the locomotive for trail unit operation). In the case where a locomotive's reverser must be in the center position to enable the AESS system, placing the lead unit's reverser in the center position will allow the AESS system to be enabled in each locomotive in the consist. Similarly, in the case where moving an automatically shutdown locomotive's reverser from the center position induces an automatic engine restart, moving the reverser in an automatically shutdown lead unit from the center position induces an automatic restart for each automatically shutdown locomotive in the consist.

Although deployed AESS systems have proven reliable, the inventors hereof have discovered human factors that result in unrealized fuel savings. For example, they discovered that operators frequently take steps to prevent automatic engine shutdowns. This is apparently done so that lead units (including single units operating independently and not in a consist) remain available upon demand (i.e., for operator peace of mind), and to provide climate control (i.e., heating and air conditioning) to the operator cabin. Common approaches to preventing automatic engine shutdowns include maintaining a lead unit's reverser out of the center position, and manually moving an automatic start/stop disable switch (ASDS), typically located in a CA1 locker, to an "off" position. Service personnel may also forget to move the ASDS to its "on" position after switching it "off" for safety during maintenance procedures. Regardless of how or why it occurs, preventing an AESS system in a single locomotive from performing its intended function obviously results in lost fuel savings. Moreover, preventing an auto shutdown in the lead unit of a consist may prevent an auto shutdown for each trail unit in the consist. Thus, although an operator may, for example, maintain the lead unit's reverser out of the center position for the sole purpose of keeping the lead unit running, the net result may be that two, three, or even more trail units remain running and consuming fuel, in addition to the lead unit.

A related problem discovered by the inventors is unnecessary operator induced restarts, which occur, for example, when an operator moves the reverser of an automatically shutdown locomotive away from the center position. The apparent reasons for such restarts are essentially the same as those for preventing automatic engine shutdowns, namely, to resume on-demand availability of lead units and to provide climate control to the operator cabin. Again, while an operator's intention may be to simply restart a lead unit, the effect may be to restart every locomotive in a consist.

The inventors have determined that unrealized fuel savings are often an order of magnitude greater than actual fuel savings primarily due to operator interaction issues, and have therefore recognized a need for AESS systems that can interact more favorably with locomotive operators, taking into account operator needs and concerns, so as to realize increased fuel savings and conservation.

SUMMARY OF THE INVENTION

In order to solve these and other needs in the art, the inventors hereof have designed an automatic engine start/stop (AESS) system for locomotives which takes into account operator needs and concerns by enabling operators to locally prevent automatic shutdowns of their locomotives without disabling their AESS systems. Thus, operators can maintain their lead (and/or other) units running (i.e., for peace of mind, climate control, etc.) without disabling their AESS systems and without prohibiting other locomotives in consist from automatically shutting down. The system preferably includes an inhibit switch located in each locomotive control cabin which, when actuated by an operator, prevents that locomotive (and only that locomotive) from automatically shutting down within a predefined duration of time, such as two hours. In the event the operator subsequently motors the locomotive before the predefined duration of time expires, the AESS system is preferably reset. Otherwise, when the predefined duration of time has passed, the locomotive will automatically shutdown (assuming a set of automatic engine shutdown parameters are satisfied at that time). The present invention also provides several techniques for reminding and prompting an operator to enable an AESS system, including sounding an alarm, displaying and recording fault data, and inhibiting motoring of the locomotive when the AESS system is disabled and the operator calls for braking or motoring capability.

According to one aspect of the present invention, an engine control system for a locomotive includes a memory device for storing computer instructions, a computer processor for executing the computer instructions stored in the memory device, the computer instructions configuring the computer processor to output one or more commands when one or more predefined conditions exist, and engine control hardware for controlling the locomotive engine in response to commands output by the computer processor. The computer processor includes an input for receiving a signal indicative of whether an automatic engine stop system is enabled. The computer instructions configure the computer processor to normally output an engine shutdown command when the automatic engine stop system is enabled and a set of automatic engine shutdown parameters are satisfied. The computer processor also includes an input for receiving an inhibit command from an operator of the locomotive. The computer instructions further configure the computer processor to at least delay outputting the engine shutdown command in response to the inhibit command.

According to another aspect of the present invention, a method of implementing an automatic engine stop system in a locomotive includes deactivating the automatic engine stop system in response to operator input to prevent the automatic engine stop system from automatically shutting down the locomotive without disabling the automatic engine stop system.

According to yet another aspect of the invention, a method for prompting an operator of a locomotive to enable an automatic engine stop system includes sounding an audible alarm when the automatic engine stop system is disabled and the operator initiates braking or motoring.

According to a further aspect of the invention, a method for prompting an operator of a locomotive to enable an automatic engine stop system includes inhibiting motoring of the locomotive until the automatic engine stop system is enabled.

According to still another aspect of the invention, a computer-readable medium has computer-executable instructions recorded thereon for implementing any one or more of the systems and methods described herein.

Other aspects and features of the present invention will be in part apparent and in part pointed out hereinafter.

BRIEF DESCRIPTION OF THE DRAWINGS

Corresponding reference characters indicate corresponding features throughout the several views of the drawings.

DETAILED DESCRIPTION OF THE PREFERRED EMBODIMENT

Figure 1:
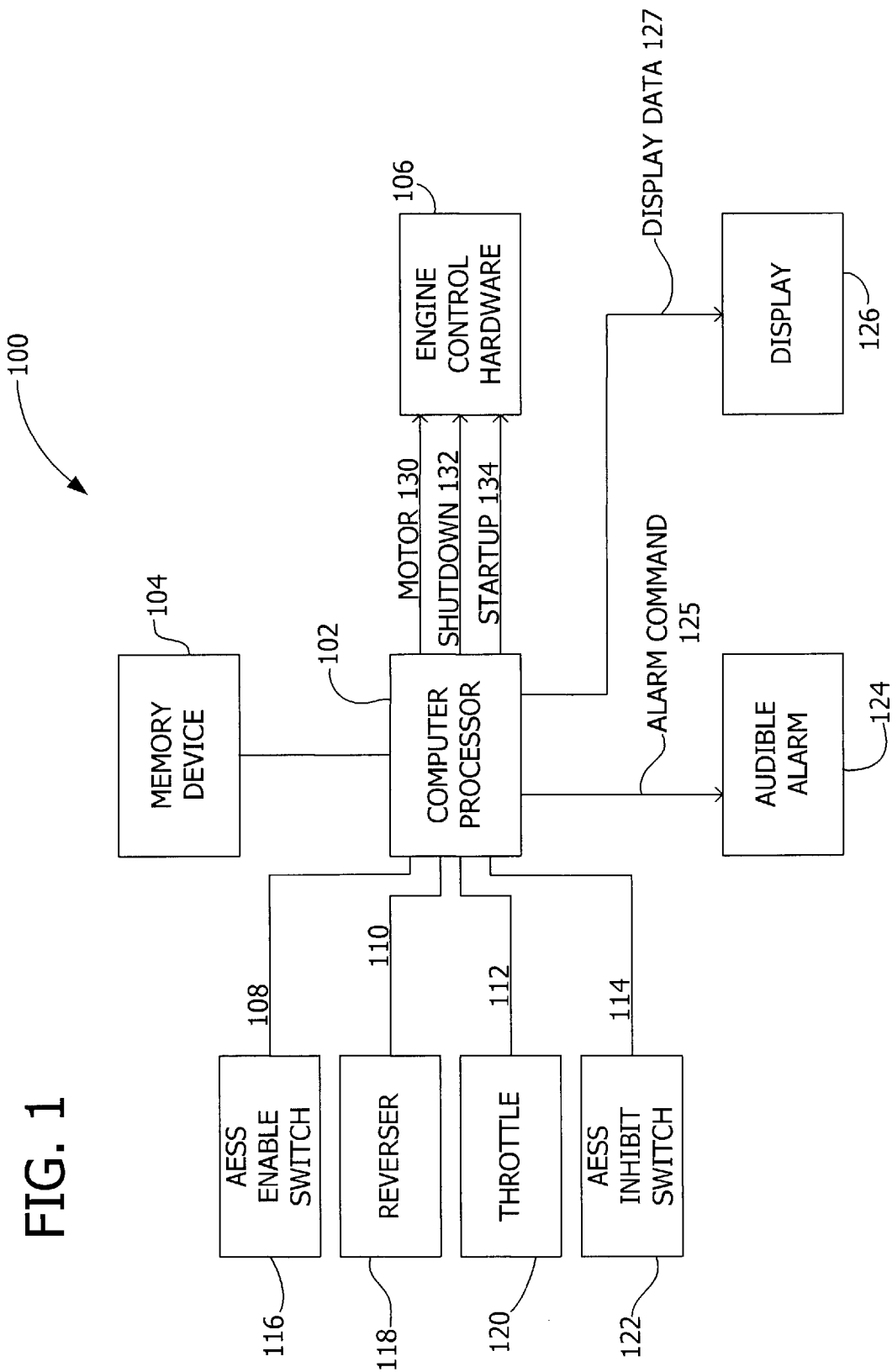
FIG. 1 is a functional block diagram of a locomotive engine control system according to the present invention.

A locomotive engine control system according to one preferred embodiment of the present invention is illustrated in FIG. 1 and indicated generally by reference character 100. As shown in FIG. 1, the control system 100 includes a computer processor 102, a memory device 104 and engine control hardware 106. The memory device 104 may itself comprise multiple static and/or dynamic memory devices, as is common. The computer processor 102 is provided with several inputs 108, 110, 112, 114 for receiving signals from an automatic engine start/stop (AESS) enable switch 116, a reverser 118, a throttle 120, and an AESS inhibit switch 122, respectively. The signal from the AESS enable switch 116 preferably indicates a position of the switch 116 which, in turn, indicates whether an AESS system is enabled. The signals from the reverser 118 and the throttle 120 preferably indicate the respective positions of the locomotive's reverser and throttle. Although a variety of switch types can be used, the AESS inhibit switch 122 is preferably a push-button switch which, when actuated by an operator, sends an inhibit command to the computer processor 102 so as to prevent or postpone an automatic engine shutdown, as further described below. As a result, the operator is enabled to prevent an automatic shutdown of the lead unit in a consist, or any other unit similarly equipped with the control system 100, without disabling an AESS system and without necessarily preventing an automatic shutdown of other locomotives in the consist.

The control system 100 further includes an audible alarm 124 and a display device 126. The audible alarm 124 preferably sounds in response to receiving an alarm command 125 from the computer processor 102. In one embodiment, the alarm 124 is a trainline alarm which, when activated, sounds within each locomotive in a consist. The display device 126 preferably displays data 127 received from the computer processor including, when applicable, data indicating that an AESS system is disabled. In one embodiment, the display data 127 is first received by the computer processor 102 over a trainline, and indicates that the AESS system of another locomotive is disabled.

Those skilled in the art will recognize that the control system 100 may include components in addition to those shown in FIG. 1, and that the computer processor may include inputs and outputs in addition to those shown in FIG. 1.

The memory device 104 preferably stores computer instructions to be executed by the computer processor 102. These computer instructions configure the computer processor to output one or more commands when one or more predefined conditions exist. For example, the computer processor 102 may output a motor command 130 in response to signals from the reverser 118 and the throttle 120 indicating an operator's attempt to motor (i.e., move) the locomotive. The engine control hardware controls the locomotive engine (not shown) in response to commands output by the computer processor, including the motor command 130, a shutdown command 132, and a startup command 134. As apparent to those skilled in the art, the engine control hardware 106 may include a variety of components including invertors, relays, an alternator, a fuel pump, etc.

Figure 2:
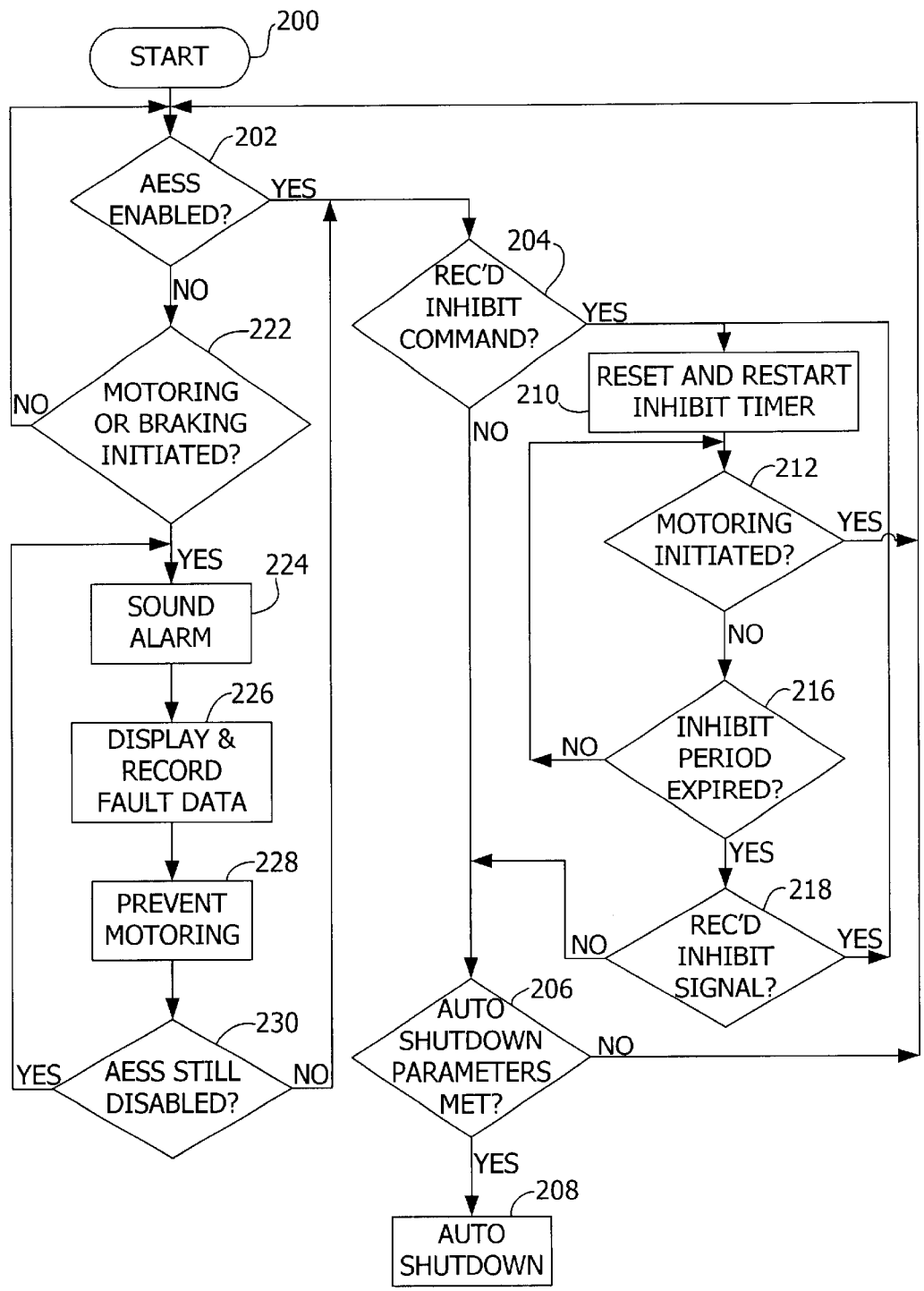
FIG. 2 is a flow chart illustrating a preferred operation of the control system of FIG. 1.

A preferred operation of the control system 100 will now be described with reference to the flow chart of FIG. 2. After beginning at block 200, processing proceeds to block 202 where the control system determines whether the AESS system is enabled (e.g., using the signal from the AESS enable switch 116). If the AESS system is enabled, processing branches to block 204 where the control system determines whether an inhibit command has been received from the locomotive operator (e.g., using the signal from the AESS inhibit switch 122). If not, processing continues at block 206 where it is determined whether a set of automatic engine shutdown parameters are satisfied. As known in the art, this set of parameters may require the engine to have been running for some minimum amount of time, zero ground speed, a minimum engine oil temperature, a minimum brake air pressure, the reverser 118 in the center position, the throttle 120 in the idle position, etc. If the set of auto engine shutdown parameters are not satisfied, processing loops back to block 202, as shown in FIG. 2. Otherwise, processing proceeds to block 208 where the locomotive engine is automatically shutdown so as to conserve fuel (e.g., by sending the shutdown command 132 to the engine control hardware 106). This is considered the normal operation of the control system, when no inhibit command is received from the operator.

Referring again to block 204, if an inhibit command has been received from the locomotive operator, processing preferably branches to block 210. In this embodiment, when the AESS inhibit switch 122 is actuated by the operator, the control system 100 preferably refrains from automatically stopping the locomotive engine for a predefined duration of time, such as two hours. In this manner, the operator can temporarily deactivate the AESS system so as to postpone an automatic engine shutdown without disabling the AESS system. During this time, the deactivated AESS system preferably continues to process inputs and outputs, but will not output the shutdown command 132. The AESS system is preferably reactivated automatically when the predefined inhibit period times-out, and will then proceed to automatically shutdown the locomotive if the set of automatic engine shutdown parameters are satisfied and the operator has not provided another inhibit command. Accordingly, an inhibit timer (preferably implemented within the computer processor 102) is preferably started in block 210 to measure the amount of time elapsed following actuation of the AESS inhibit switch 122. Processing then proceeds to block 212, where the control system determines whether the operator has initiated motoring of the locomotive (e.g., as determined by signals from the reverser 118 and the throttle 120 or, in the case where the locomotive is operating as a trail unit in a consist, by trainline signals from the reverser and throttle of the lead unit). If motoring has been initiated, processing automatically reactivates the AESS system by branching back to block 202, as shown in FIG. 2.

If the control system 100 determines in block 212 that motoring has not been initiated, processing proceeds to block 216 where the system determines whether the predefined inhibit period has expired. If not, processing loops back to block 212. If the inhibit period has expired, processing continues at block 218 to determine whether another inhibit signal has been received from the operator. Thus, an operator can preferably repeatedly postpone an automatic shutdown of a locomotive engine by periodically actuating the AESS inhibit switch 122. If another inhibit signal has not been received, processing branches to block 206 to determine whether the set of automatic engine shutdown parameters are satisfied, as described above. If the system determines at block 218 that another inhibit signal has been received from the operator, processing branches back to block 210 where the inhibit timer is reset and restarted, and then proceeds as described above.

It should be clear from the description above that, in one preferred embodiment, the AESS system is automatically reactivated, and the prior inhibit command from the operator is disregarded, when the predefined inhibit period expires, or when the operator initiates motoring (if sooner). This functionality is preferably implemented locally within each locomotive in a consist so that the AESS system of a particular locomotive in the consist can be locally deactivated by an operator without necessarily affecting the AESS systems of other locomotives in the consist.

Referring again to block 202 of FIG. 2, if the system 100 determines that the AESS system is disabled (e.g., because the AESS enable switch 116 is in an "off" position), processing proceeds to block 222 where the control system determines whether the operator has initiated braking or motoring. If not, processing loops back to block 202. If braking or motoring has been initiated, processing continues at block 224 where an audible alarm is preferably sounded so as to remind and prompt the operator to enable the AESS system. In one embodiment of the invention, the audible alarm is a trainline alarm which sounds within every locomotive in a consist. In this manner, an operator in a lead unit may discover upon initiating braking or motoring that the AESS system in the lead unit, or an AESS system in a trail unit, is disabled. Processing then preferably continues at block 226 where fault information is displayed on the display device 126. The displayed fault information preferably indicates that the AESS system is disabled, and prompts the operator to enable the AESS system (e.g., by explaining the necessary step(s)). In one embodiment, the fault information is placed on the trainline, and is presented on the display of each locomotive in a consist.

Also in block 226, fault data is recorded in the memory device 104 so as to record each instance when the operator initiates braking or motoring while the AESS system is disabled (which should generally only occur during a maintenance procedure). Continuing at block 228, the control system 100 may also prevent the locomotive from motoring (e.g., by withholding the motor command 130) while the AESS system is disabled, again in an effort to prompt the operator to enable the AESS system. In one embodiment, this functionality is implemented only locally (i.e., not via the trainline). Therefore, if the AESS system in a trail unit of a consist is disabled, the lead unit will still have motoring capability. At block 230, the control system determines whether the AESS system is still disabled. If it is, processing loops back to block 224 such that the audible alarm continues to sound, fault data continues to be displayed and recorded, and motoring of the locomotive remains inhibited. Alternatively, if it is determined in block 230 that the AESS has been enabled, processing loops back to block 204, as shown in FIG. 2.

The above-described functionality is preferably implemented in computer instructions stored in the memory device 104 and executed by the computer processor 102.

It should be clear from the description above that the present invention enables an operator to prevent or at least postpone an automatic shutdown of a locomotive engine without disabling an AESS system. Accordingly, during normal operations (in contrast to maintenance operations), an operator may have no need for the AESS enable switch 116, which preferably remains in the "on" position. For this reason, in one embodiment of the invention, the AESS enable switch 116 is moved from the CA1 locker to a location less accessible to operators, such as a high voltage maintenance cabinet (e.g., the auxiliary cabinet), to further reduce the likelihood of an operator disabling the AESS system during normal operations by moving the AESS enable switch 116 to the "off" position.

In the embodiment described above with reference to FIG. 2, multiple prompts are employed (i.e., the alarm sounds, fault data is displayed and recorded, and motoring of the locomotive is inhibited) when the AESS system is disabled and the operator calls for braking or motoring capability, all in an effort to prompt the operator to enable the AESS system. It should be understood, however, that fewer than all of such prompts may be used in certain applications without departing from the scope of the invention. It should also be understood that the teachings of the present invention can be applied in conjunction with or without automatic engine restart capability.

When introducing elements or features of the present invention or the preferred embodiment(s) thereof, the articles "a", "an", "the" and "said" are intended to mean that there are one or more such elements or features. The terms "comprising", "including" and "having" are intended to be inclusive and mean that there may be additional elements or features other than those listed.

As various changes could be made in the above embodiments without departing from the scope of the invention, it is intended that all matter contained in the above description or shown in the accompanying drawings shall be interpreted as illustrative and not in a limiting sense.

What is claimed:

1. An engine control system for a locomotive, the control system comprising:
a memory device for storing computer instructions;
a computer processor for executing the computer instructions stored in the memory device, the computer instructions configuring the computer processor to output one or more commands when one or more predefined conditions exist; and
engine control hardware for controlling the locomotive— engine in response to commands output by the computer processor;
the computer processor including an input for receiving a signal indicative of whether an automatic engine stop system is enabled;
the computer instructions configuring the computer processor to normally output an engine shutdown command when the automatic engine stop system is enabled and a set of automatic engine shutdown parameters are satisfied;
the computer processor including an input for receiving an inhibit command from an operator of the locomotive;
the computer instructions further configuring the computer processor to at least delay outputting the engine shutdown command in response to the inhibit command.

2. The control system of claim 1 further comprising an inhibit switch for generating the inhibit command when the inhibit switch is actuated by the operator.

3. The control system of claim 1 wherein the computer instructions configure the computer processor to delay outputting the engine shutdown command for a predefined duration of time after the computer processor receives the inhibit command.

4. The control system of claim 3 wherein the computer instructions configure the computer processor to disregard the inhibit command received from the operator if the operator initiates motoring during the predefined duration of time.

5. The control system of claim 1 wherein the computer instructions configure the computer processor to normally output a motor command to the engine control hardware when the operator initiates motoring, and further configure the computer processor to withhold the motor command if the automatic engine stop system is disabled.

6. The control system of claim 1 further comprising an audible alarm for providing an audible alarm signal in response to an alarm command from the computer processor, the computer instructions configuring the computer processor to output the alarm command when the automatic engine stop system is disabled and the operator initiates braking or motoring.

7. The control system of claim 1 wherein the computer instructions configure the computer processor to record fault data in the memory device when the automatic engine stop system is disabled and the operator initiates braking or motoring.

8. The control system of claim 1 further comprising a display device for displaying data received from the computer processor, the computer instructions further configuring the computer processor to send data indicating the automatic engine stop system is disabled to the display device when the automatic engine stop system is disabled and the operator initiates braking or motoring.

9. A method of implementing an automatic engine stop system in a locomotive, the method comprising deactivating the automatic engine stop system in response to operator input to thereby prevent the automatic engine stop system from automatically shutting down the locomotive without disabling the automatic engine stop system.

10. The method of claim 9 wherein deactivating includes providing a switch which, when actuated by the operator with the automatic engine stop system enabled, at least temporarily prevents an automatic shutdown of the locomotive.

11. The method of claim 10 wherein actuating the switch renders the automatic engine stop system at least temporarily inactive, the method further comprising automatically reactivating the automatic engine stop system a predetermined amount of time after the switch is actuated.

12. The method of claim 10 wherein actuating the switch renders the automatic engine stop system at least temporarily inactive, the method further comprising automatically reactivating the automatic engine stop system when the operator initiates motoring.

13. The method of claim 9 wherein the locomotive is one of a plurality of locomotives operating in consist, each of said locomotives having an automatic engine stop system, and wherein deactivating includes providing a switch in each of said locomotives which, when actuated with the automatic engine stop system for the associated locomotive enabled, at least temporarily prevents an automatic shutdown of the associated locomotive.

14. The method of claim 9 wherein the locomotive is one of a plurality of locomotives operating in consist, each of said locomotives having an automatic engine stop system, and wherein deactivating includes deactivating the automatic engine stop system of said one locomotive while another of said locomotives is automatically shutdown.

15. The method of claim 9 further comprising positioning an automatic stop enable switch for the automatic engine stop system in a high voltage maintenance cabinet of the locomotive.

16. A method for prompting an operator of a locomotive to enable an automatic engine stop system, the method comprising sounding an audible alarm when the automatic engine stop system is disabled and the operator initiates braking or motoring.

17. The method of claim 16 wherein sounding includes sounding the audible alarm until the automatic engine stop system is enabled.

18. The method of claim 16 wherein the locomotive is one of a plurality of locomotives operating in consist and wherein sounding includes sounding a trainline alarm within each of said locomotives.

19. The method of claim 16 further comprising displaying information on a display when the automatic engine stop system is disabled and the operator initiates braking or motoring, the displayed information prompting the operator to enable the automatic engine stop system.

20. The method of claim 16 further comprising automatically recording fault data when the automatic engine stop system is disabled and the operator initiates braking or motoring.

21. The method of claim 16 wherein sounding includes sounding the audible alarm while the locomotive is motoring.

22. A computer-readable medium having computer-executable instructions for implementing the method of claim 16.

23. A method for prompting an operator of a locomotive to enable an automatic engine stop system, the method comprising inhibiting motoring of the locomotive until the automatic engine stop system is enabled.

24. The method of claim 23 further comprising displaying information on a display when the automatic engine stop system is disabled and the operator initiates braking or motoring, the displayed information prompting the operator to enable the automatic engine stop system.

25. The method of claim 23 further comprising sounding an audible alarm when the automatic engine stop system is disabled and the operator initiates braking or motoring.

26. The method of claim 25 wherein the locomotive is one of a plurality of locomotives operating in consist, and the audible alarm is a trainline alarm which sounds within each of said locomotives.

27. The method of claim 23 further comprising automatically recording fault data when the automatic engine stop system is disabled and the operator initiates braking or motoring.

28. The method of claim 23 further comprising enabling the operator to prevent an automatic shutdown of the locomotive without disabling the automatic engine stop system.

29. The method of claim 23 wherein the operator can enable the automatic engine stop system via an automatic stop enable switch.

* * * * *